United States Patent [19]

Coakley

[11] 3,936,415

[45] Feb. 3, 1976

[54] OXIDIZED POLYOLEFIN-HIGH MOLECULAR WEIGHT ELASTOMERIC MIXTURE

[75] Inventor: Thomas A. Coakley, Heath, Ohio

[73] Assignee: Owens-Corning Fiberglas Corporation, Toledo, Ohio

[22] Filed: May 6, 1974

[21] Appl. No.: 467,182

[52] U.S. Cl. ........ 260/42.15; 260/42.14; 260/42.45; 260/42.46
[51] Int. Cl.² .......................................... C08K 9/06
[58] Field of Search...... 260/42.14, 42.15, 29.2 UA; 217/126 GB

[56] References Cited
UNITED STATES PATENTS

| | | | |
|---|---|---|---|
| 3,416,990 | 12/1968 | Robinson | 260/42.14 X |
| 3,650,810 | 3/1972 | Marzocchi | 260/42.14 X |
| 3,751,397 | 8/1973 | Muto | 260/42.15 |

Primary Examiner—Lewis T. Jacobs
Attorney, Agent, or Firm—Carl G. Staelin; John W. Overman; Philip R. Cloutier

[57] ABSTRACT

Glass fibers are coated with a mixture of an organo silane coupling agent, an oxidized polyolefin, and a carboxylated high molecular weight elastomer having a solubility parameter similar to that of polyolefin. In the preferred arrangement the coupling agent, polyolefin, and high molecular weight elastomer are in the form of an aqueous emulsion which is applied to the fibers as a coating at forming, and then dried. The silane coupling agent may be applied either as an initial coating or in mixture with the emulsions, and the coated fibers when dried are particularly adapted for the production of composites having a polyolefin matrix and a reinforcement of the coated glass fibers.

15 Claims, No Drawings

OXIDIZED POLYOLEFIN-HIGH MOLECULAR WEIGHT ELASTOMERIC MIXTURE

BACKGROUND OF THE INVENTION

Crystalline polyolefins, while they have relatively high strength, bond poorly to glass fibers even though coupling agents are used to promote wetout of the fibers. It would seem that coupling agents would attach the polyolefin coating material to the glass fibers, and that a polyolefin coating on the fibers would attach to a polyolefin matrix forming material; but such composites have not exhibited any appreciable increase in strength by reason of the glass fibers.

The principal object of the present invention, therefore, is the provision of a new and inexpensive coating for glass fibers which will achieve a better bond to polyolefin matrix forming materials than do prior art materials.

DESCRIPTION OF THE PREFERRED EMBODIMENTS

According to the invention it has been discovered that carboxylated high molecular weight elastomeric molecules when added to oxidized polyolefin materials will provide a coating on glass fibers which produce a better bond to polyolefin matrix forming materials than do coatings of the polyolefins by themselves. Polyolefin film formers, as for example, polypropylene of the type suitable for making coatings may have a molecular weight between 10,000 and 20,000. Elastomers, on the other hand, usually have molecular weights above 200,000 and may have a molecular weight of 1,000,000 or more. It is theorized that such high molecular weight elastomers when intimately mixed with the molecules of the polyolefin film former, either project out of the dried coating on the fibers or are caused to project out of the polyolefin film on the fibers when the coating is contacted by a compatible polyolefin matrix forming material. Heat or solvents or both are used to fuse the matrix forming polyolefins around the coated glass fibers, and this heat and/or solvent mobilizes the molecules of the coating on the fibers to allow the high molecular weight molecules of elastomer to become mingled with the molecules of the polyolefin matrix forming material.

Polyolefins have very little, if any, remaining functionality on their molecules; so that the coupling agents used therewith depend upon a mechanical intermingling with the polyolefin molecules to develop a bond to the glass fibers. This being true substantially any silane coupling agent can be used, as for example, the alkoxy silanes, polyolefin silanes, amino silanes, etc.. In order to achieve maximum mingling of the high molecular weight elastomeric molecules with the polyolefin molecules, they should have substantially the same solubility parameters, i.e. be soluble in substantially the same solvents. As previously stated, it has been found that the polyolefins used for bonding to the glass fibers must be oxidized to provide oxygen bonding sites on the molecules, and particularly carboxylic acid groups. This being the case, the preferred high molecular weight elastomeric molecules should also contain up to approximately 5% of carboxyl groups in order that the solubility parameters of the elastomer will correspond with those of the polyolefin.

EXAMPLE 1

One hundred parts by weight of an isotactic polypropylene having a molecular weight of 10,000 was added to a suitable mixing vessel along with 300 parts by weight of xylene and 1 part by weight of potassium permanganate as an oxidizing agent. The mixture was heated to 80°C with reflux for 4 hours, during which air was bubbled through the mixture. Thereafter the mixture was cooled, and an emulsion was prepared by mixing with 500 parts by weight of water containing 5 parts by weight of polyoxyethylene sorbitan monooleate. The water was added slowly to the mixture with agitation until the emulsion inverted, following which the balance of the water was added to provide a stable emulsion.

A size was made from the following materials in parts by weight:

| Ingredients | Parts By Wt. | Solids |
| --- | --- | --- |
| Oxidized polypropylene emulsion (33% solids) | 100.00 | 4.4 |
| Carboxylated elastomeric latex (30% solids) (48% styrene - 48% butadiene 4% acrylic acid terpolymer having a molecular weight of 500,000) | 66.8 | 3.0 |
| Glass coupling agent (gamma aminopropyltrimethoxysilane) | 8.34 | 1.1 |
| Deionized water | 644 | 92.5 |

The size was prepared by adding 240 parts of deionized water to a main mix tank following which the silane coupling agent was added slowly and stirred for 15 minutes. Thereafter another 240 parts of deionized water are added to another premix tank, and the oxidized polypropylene emulsion was added. The elastomer emulsion was then added to the premix tank and the total was mixed for 5 minutes. Thereafter the contents of the premix tank was added to the main mix tank and the contents agitated for 10 minutes. The materials were then stored at room temperature under slow agitation until applied to the glass fibers. The size was applied to 408 E-glass fibers having a diameter of 0.0005 inch at forming, following which they were brought together into a strand and wound into a package that was thereafter dried at room temperature for 72 hours. The strand was unraveled from the package and chopped into ¼ inch lengths, following which the chopped strand was dried at 300°F for 1 hour.

Twenty grams of these short chopped fibers were then placed in a drum tumbler with 80 grams of a reactor flake polypropylene having a molecular weight of approximately 50,000 and the materials were thoroughly mixed. The mixture was then placed in a 1-inch national rubber screw machine extruder that was electrically heated to 500°F, and the mixture was extruded into a ¼ inch diameter cylindrical rod that was then fed into a pelletizer to form ¼ inch long pellets. The pellets were fed to an injection molding machine heated to 500°F and the material was extruded to a standard ASTM-D638 dogbone specimen. The specimen when cooled to room temperature and tested in a standard tensile testing machine broke at 8,000 pounds per square inch. By way of a control, or comparison, and not according to the invention, glass fibers that were similarly coated except that the coating did not contain a high molecular weight elastomer, and in which the polypropylene was not oxidized, gave a dogbone sample strength of 6,500 pounds per square inch.

EXAMPLE 2

The process of Example 1 was repeated excepting that the oxidized polypropylene was replaced by a copolymer of polypropylene containing 4% acrylic acid. The polypropylene copolymer was prepared by dissolving 95 parts of propylene monomer and 4 parts of acrylic acid in 200 parts of xylene. One part of benzoyl peroxide was added and the temperature was raised to 75°C over a period of 6 hours with reflux to produce the copolymer in the xylene solvent. An emulsion was then prepared of this material, and this emulsion was then substituted, in the procedure given in Example 1, for the emulsion of oxidized polypropylene. The dogbone sample that was produced had generally the same strength and other properties as did the dogbone sample of Example 1.

EXAMPLE 3

The process of Example 1 was repeated excepting that the oxidized polypropylene was replaced with oxidized propylene that was obtained from the still bottoms of a reactor that was used to produce normal polypropylene. These still bottoms had high molecular weight and contained sufficient oxygen in the form of carboxyl groups to comprise approximately 2% by weight of the polypropylene still bottoms. The dogbone sample which was produced had substantially the same strength as that produced by the procedure given in Example 1.

EXAMPLE 4

The process of Example 1 was repeated excepting that oxidized polyethylene was used for the film former, and polyethylene was used for the matrix resin. The dogbone samples produced had substantially the same properties as did that of Example 1.

EXAMPLE 5

The process of Example 1 was repeated excepting that the carboxylated elastomer was a carboxylated-butadiene-acrylonitrile elastomer having a molecular weight of 500,000 and which was carboxylated with 2% of acrylic acid. The dogbone sample so produced had a strength of approximately 8,000 psi.

EXAMPLE 6

The process of Example 1 was repeated using a terpolymer of 48% isobutylene, 48% butadiene, and 4% acrylic acid, and the dogbone sample so produced had substantially the same properties as did that of Example 1.

EXAMPLE 7

The process of Example 1 was repeated excepting that a straight chain polyurethane (reaction product of ethylene glycol, succinic anhydride and toluene diisocyanate) having a molecular weight of 200,000 and 4% carboxylation was substituted for the styrene-butadiene elastomer of Example 1. The dogbone sample produced had substantially the same properties as that of Example 1.

EXAMPLE 8

The process of Example 1 was repeated excepting that the fibers were coated at forming with an aqueous gamma aminopropyltriethoxysilane solution only and were then dried. Thereafter the strand was pulled through a xylene solution of the oxidized polypropylene and carboxylated butadiene-styrene materials, instead of the aqueous emulsion of these same materials used in Example 1. The dogbone sample produced had substantially the same properties as did the sample of Example 1.

EXAMPLE 9

The process of Example 1 was repeated excepting that gamma methacryloxypropyltrimethoxysilane was substituted for the silane of Example 1. The dogbone specimen so produced had substantially the same properties as that of Example 1.

It will now be apparent that any long chain elastomer can be used which has a solubility parameter similar to that of the oxidized polyolefin with which it is to be used. In most instances the elastomer will be made more compatible with the oxidized polyolefin by causing the polyolefin to contain carboxyl radicals up to approximately 5% by weight. It is further apparent that the polyolefin must be oxidized to provide sites for better coupling with the glass. The oxygen can be present as the aldehyde group, an OH group, or the carboxyl group, but in most oxidation processes, will be present as carboxyl groups, since oxidation from the aldehyde, to the alcohol, to the acid takes place more easily than does the formation of the aldehyde.

In general, the size compositions that are preferred are aqueous emulsions since they avoid flammability problems adjacent the hot forming bushings from which the fibers are pulled. For such applications the sizing material will preferably contain the following ingredients in parts by weight:

| Ingredients | Parts by Weight |
| --- | --- |
| Emulsified particles of oxidized polyolefin (solids) | .5 to 25 |
| Carboxylated elastomeric molecules having molecular weight of from 200,000 to 1,000,000 (solids) | .5 to 15 |
| Silane glass coupling agent | .01 to 5 |
| Water | Balance |

Organic solutions of the same materials can be used, however, using the same parts by weight but substituting an organic solvent for the water. The dried coatings on the fibers will comprise the same parts by weight of solids. The coatings on the fibers, however, preferably comprise the following percentages by weight:

| | |
| --- | --- |
| Oxidized polyolefin | 49.99 to 99.49 |
| Carboxylated elastomer | .5 to 50 |
| Silane glass coupling agent | .01 to 5 |

While the invention has been described in considerable detail, I do not wish to be limited to the particular embodiments shown and described, and it is my intention to cover hereby all novel adaptations, modifications and arrangements thereof which come within the practice of those skilled in the art to which the invention relates.

I claim:

1. A method of bonding a polyolefin to glass fibers comprising: preparing a liquid mixture of oxidized polyolefin and a carboxylated high molecular weight elastomer having a solubility parameter similar to that of the oxidized polyolefin, coating glass fibers with said mixture, drying the coating to form a film of oxidized polypropylene having high molecular weight molecules of the elastomer therein, and embedding the coated fibers in the matrix of the polyolefin to be reinforced.

2. The method of claim 1 wherein the coating on the fibers includes a silane glass coupling agent.

3. The method of claim 2 wherein the elastomer is a carboxylated, butadiene terpolymer.

4. The method of claim 3 wherein the polyolefin in the coating is a carboxylated polypropylene.

5. A method of bonding a polyolefin to glass fibers comprising: preparing an aqueous mixture of emulsified particles of oxidized polyolefin and emulsified particles of a high molecular weight elastomer having a solubility parameter similar to that of the emulsified particles of polyolefin, coating glass fibers with said aqueous mixture, drying the coating to form a film of oxidized polyolefin having high molecular weight molecules of said elastomer therein, and embedding the coated fibers in a matrix of the polyolefin to be reinforced.

6. The method of claim 5 wherein the oxidized polyolefin in the coating is a polypropylene.

7. The method of claim 6 wherein the coating includes an organo silane glass coupling agent.

8. The method of claim 7 wherein the elastomer is a carboxylated, butadiene terpolymer.

9. The method of claim 8 wherein the elastomer in the coating is a carboxylated styrene, butadiene terpolymer.

10. A composite comprising glass fibers dispersed throughout and reinforcing a polyolefin matrix resin, said glass fibers having a coating thereon of an oxidized polyolefin, a glass silane coupling agent, and an elastomer having a molecular weight of at least about 200,000 with molecules of said elastomer being embedded in said coating of oxidized polyolefin and extending into said polyolefin matrix that is reinforced by said fibers.

11. The composite of claim 10 wherein the polyolefin is an oxidized polypropylene.

12. The composite of claim 10 wherein the elastomer is a carboxylated, butadiene terpolymer.

13. The composite of claim 12 wherein the elastomer is a carboxylated styrene, butadiene terpolymer.

14. The composite of claim 13 wherein the polyolefin is a carboxylated polypropylene.

15. The composite of claim 14 wherein the glass coupling agent is gamma aminopropyltrialkoxysilane.

* * * * *